(12) United States Patent
Shah et al.

(10) Patent No.: US 7,165,059 B1
(45) Date of Patent: Jan. 16, 2007

(54) PARTIAL FILE MIGRATION MECHANISM

(75) Inventors: Aalop Shah, Pune (IN); Samir Desai, Pune (IN); Milind Borate, Pune (IN)

(73) Assignee: Veritas Operating Corporation, Mountain View, CA (US)

(*) Notice: Subject to any disclaimer, the term of this patent is extended or adjusted under 35 U.S.C. 154(b) by 483 days.

(21) Appl. No.: 10/745,174

(22) Filed: Dec. 23, 2003

(51) Int. Cl.
*G06F 17/30* (2006.01)

(52) U.S. Cl. .......................................... 707/1

(58) Field of Classification Search ............... 707/1, 707/2, 9, 10, 203; 714/42; 709/224
See application file for complete search history.

(56) References Cited

U.S. PATENT DOCUMENTS 6,981,005 B1 * 12/2005 Cabrera et al. ............. 707/203

2004/0153841 A1 * 8/2004 Beck ............................ 714/42

* cited by examiner

*Primary Examiner*—Etienne P. LeRoux
(74) *Attorney, Agent, or Firm*—Robert C. Kowert; Meyertons, Hood, Kivlin, Kowert & Goetzel, P.C.

(57) ABSTRACT

System and method for partial file migration in file systems by Hierarchical Storage Management (HSM) applications. Embodiments may provide an automated mechanism for HSM applications to partially migrate files by migrating the inactive parts of the files to offline storage while leaving the active parts of the files on disk and active in the file system. In embodiments, access information including timestamps may be recorded and maintained at the subfile level to enable detection of inactivity at the subfile level and hence partial file migration by migrating only the inactive parts of files. The parts of files may be extents, blocks, or ranges. The access information may be recorded and maintained in-memory only, in a separate file on disk, or in extent descriptors for the files.

41 Claims, 6 Drawing Sheets

PARTIAL FILE MIGRATION MECHANISM

BACKGROUND OF THE INVENTION

1. Field of the Invention

This invention is related to the field of computer systems and, more particularly, to Hierarchical Storage Management (HSM) systems.

2. Description of the Related Art

In data storage environments such as corporate LANs, total storage needs are increasing and storage costs are an increasing part of the IT budget. Hierarchical Storage Management (HSM) is a data storage solution that provides access to vast amounts of storage space while reducing the administrative and storage costs associated with data storage. Rather than making copies of files as in a backup system, HSM migrates files to other forms of storage, freeing hard disk space. HSM systems may migrate files to less expensive forms of storage based on rules tied to the frequency of data access. A typical two tier HSM architecture may include hard drives as primary storage and rewritable optical or tape as tertiary, or offline, storage. Events such as crossing a storage threshold and/or reaching a certain file "age" may activate the migration process. As files are migrated off primary storage, HSM leaves stubs to the files on the hard drive(s). These stubs point to the location of the file on the alternative storage, and are used in automatic file retrieval and user access. The stub remains within the file system of the primary storage, but the file itself is migrated "offline" out of the file system onto the alternative storage (e.g. tape).

In file systems, files may include parts that are actively accessed, and other parts that are not actively accessed. For example, in data-warehousing environments and other database environments, database files may be partially inactive, with only initial headers or other parts being updated while the rest of the file is inactive. HSM applications typically decide to migrate inactive files from disk to tape by looking at timestamps at the file level, typically maintained in inodes for the files. However, file-level timestamps are inadequate for the HSM application to detect partially inactive files as in the data warehousing setups. File-level timestamps are inadequate for detecting partially inactive files. Therefore, partially inactive files remain entirely online in the file system consuming disk space. Manual methods have been used to migrate out such files and then migrate them back in to disk when required.

Mechanisms have been proposed to allow HSM application to partially migrate files by establishing a file system clone and looking at the file in the clone to determine which parts of the file has changed. However, this approach cannot detect read activity on the file and may cause unnecessary file migrations even though there is read activity on the file.

A file system may be defined as a collection of files and file system metadata (e.g., directories and inodes) that, when set into a logical hierarchy, make up an organized, structured set of information. File systems may be mounted from a local system or remote system. File system software may include the system or application-level software that may be used to create, manage, and access file systems.

File systems may use data structures such as inodes to store file system metadata. An inode may be defined as a data structure holding information about files in a file system (e.g. a Unix file system). There is an inode for each file, and a file is uniquely identified by the file system on which it resides and its inode number on that system. An inode may include at least some of, but is not limited to, the following information: the device where the inode resides, locking information, mode and type of file, the number of links to the file, the owner's user and group IDs, the number of bytes in the file, access and modification times, the time the inode itself was last modified and the addresses of the file's blocks on disk (and/or pointers to indirect blocks that reference the file blocks).

SUMMARY

Embodiments of a system and method for partial file migration in file systems by Hierarchical Storage Management (HSM) applications are described. In a file system, only a part of a file may be active while the remainder of the file may be inactive. Embodiments may provide an automated mechanism for HSM applications to partially migrate files by migrating the inactive parts of the files to offline storage while leaving the active parts of the files on disk and active in the file system. In embodiments, access information including timestamps may be recorded and maintained at the subfile level to enable detection of inactivity at the subfile level and hence partial file migration by migrating only the inactive parts of files.

File system software may establish and manage a file system on one or more storage devices. The file system software may provide access to files in the file system to one or more applications. Each file may include one or more file parts that may be individually accessed by the application(s). The file parts may be one of extents, blocks, or ranges. Typically, a file is composed of blocks or, for some file systems, extents. An extent is a set of contiguous blocks on disk; a file may include one or more extents. A range is defined by an offset into a file and a length (e.g. in bytes) of the range. In this document, "file part(s)" or "part(s) of files" may be used to refer to blocks, extents and ranges.

The file system software may record access information for file parts of a set of one or more of the files if and when the file parts are accessed by the application(s). The access information for each accessed file part may include a timestamp indicating the access time for that file part. In one embodiment, the access information is recorded in-memory only. In one embodiment, the access information is recorded in a separate file in the file system. In one embodiment, for each of the one or more files in the file set, the access information is recorded in a file change log of the file system. In one embodiment, the file parts are extents, and the access information is recorded in extent descriptors for the one or more files. In one embodiment, the subfile-level timestamps may be recorded and maintained as extended attributes of the file(s) for which subfile-level timestamps are being recorded and maintained. In one embodiment, the subfile-level timestamps may be recorded and maintained in named streams on the file(s) for which subfile-level timestamps are being recorded. In one embodiment, the access information may be recorded and maintained by a filter driver that resides between the application(s) and the file system software that manages the file system.

At some point, an HSM application may perform a partial file migration. In performing the partial file migration, the HSM application may determine from the access information one or more inactive file parts that have not been accessed for a given time interval. To determine the inactive file parts, the HSM application may compare a map of the file parts of each of the one or more files in the file set to the access information. In one embodiment, the map may be obtained from the file system software. If a file part indicated by the map does not have recorded access information, the HSM application determines that the file part is an inactive file part, and can thus be migrated offline. If a file part indicated by the map does have recorded access information, the HSM application determines if the accessed file part is an active or inactive file part from the access information for the accessed file part. To determine if the accessed file parts are active or inactive file parts, the HSM application determines the difference between the last access time for each accessed file part and a current system time. If the difference between the last access time for an accessed file part and the current system time is less than the given time interval, the HSM application determines that the accessed file part is an active file part. If the difference between the last access time for an accessed file part and the current system time is greater than the given time interval, the HSM application determines that the accessed file part is an inactive file part. The HSM application may then migrate the inactive file parts to offline storage leaving the active file parts online in the file system.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for partial file migration in file systems by Hierarchical Storage Management (HSM) applications are described. In a file system, only a part of a file may be active while the remainder of the file may be inactive. Embodiments may provide an automated mechanism for HSM applications to partially migrate files by migrating the inactive parts of the files to offline storage while leaving the active parts of the files on disk and active in the file system. In embodiments, access information including timestamps may be recorded and maintained at the subfile level to enable detection of inactivity at the subfile level and hence partial file migration by migrating only the inactive parts of files. Using embodiments, partial file migration may be automated through HSM software so that manual intervention to migrate inactive files or parts of files is not required.

In embodiments, timestamps are supported at the subfile level, for example at the block, range, or extent level. Typically, a file is composed of blocks or, for some file systems such as Veritas' VxFS, extents. An extent is a set of contiguous blocks on disk; a file may include one or more extents. A range is defined by an offset into a file and a length (e.g. in bytes) of the range. A range may or may not be associated with any particular extent or block in the file. Ranges may be fixed size or alternatively the range size may be based on how an application accesses the files. In this document, "file part(s)" or "part(s) of files" may be used to refer to blocks, extents and ranges. Extent-level, block-level, and range-level timestamps are further described below.

One embodiment may provide one or more mechanisms in file system software that an HSM application can use to detect what parts of a file are inactive, and an HSM application that can access those file system software mechanisms to detect inactive parts of files and migrate those inactive parts of the file to offline storage while keeping the active parts of the file online on the file system.

In one embodiment, access information including, but not limited to, subfile-level timestamp information may be recorded and maintained for a predetermined set of files to be monitored by the HSM application. In one embodiment, the recording and maintaining of the subfile-level timestamp information may be performed by the file system software. A file set may include one, two or more, or all of the files in a file system. For each file in the file set, as and when file parts are accessed, the access times for the file parts are recorded or updated in timestamps associated with the file parts. If the HSM application determines a file to be active, the HSM application may access the timestamp information to determine if there are file parts of the file that are inactive and that thus may be migrated to offline storage.

In one embodiment, access information including subfile-level timestamps may be recorded and maintained by a filter driver (which may also be referred to as a layered driver or a layered file system) that resides between the application(s) and the file system software, such as Veritas' VxFS, that manages the file system. Filter drivers typically intercept file operations originating from the application(s) and do some pre- and/or post-processing before and after passing the operations to the underlying file system software. In this embodiment, the filter driver may track read and write accesses to the files and file parts and record and maintain subfile-level timestamps for ranges of the files, or for blocks or extents if the filter driver can obtain the mapping information from the underlying file system, even if the underlying file system software does not do so.

In some embodiments, instead of or in addition to using subfile-level timestamps to detect subfile-level inactivity, in-memory read and write statistics may be maintained for file parts and used to detect subfile-level inactivity for partial file migration. The HSM application may analyze the in-memory statistics to determine inactive file parts and migrate the inactive file parts offline.

Embodiments may be implemented in any storage environment that supports HSM. Embodiments may be primarily targeted toward systems or configurations where parts of files are accessed and other parts of the files are inactive for long periods. The files and data in the files may be any type of files and/or data; no specific type of file data is necessary.

FIGS. 1–4 illustrate means for recording access information for accessed file parts of one or more files in a file system, wherein each file comprises one or more file parts, means for determining from the access information one or more inactive file parts that have not been accessed for a given time interval, and means for migrating the inactive file parts to offline storage while active file parts remain online in the file system.

Figure 1:
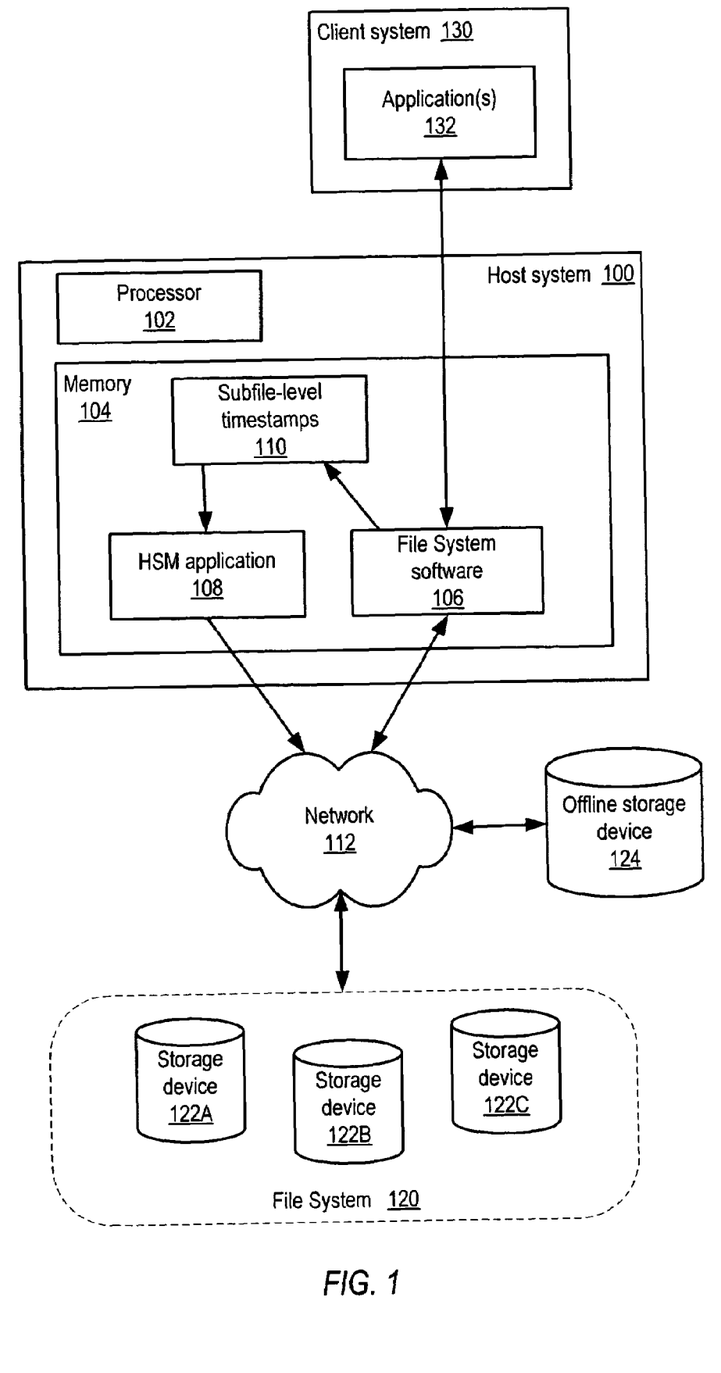
FIG. 1 illustrates a file system and an HSM application for migrating inactive files and/or portions of files offline in an exemplary network storage environment according to one embodiment.

FIG. 1 illustrates a file system and an HSM application for migrating inactive files and/or portions of files to offline storage in an exemplary network storage environment according to one embodiment. Host system 100 may be any of various types of devices, including, but not limited to, a personal computer system, desktop computer, laptop or notebook computer, mainframe computer system, workstation, network computer, or other suitable device. Host system 100 may include at least one processor 102. The processor 102 may be coupled to a memory 104. Memory 104 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

Host system 100 may couple, for example over a wired or wireless network or networks, to one or more other devices, e.g. client system 130, via one or more wired or wireless network interfaces. Host system 100 may couple over a network 112 to one or more storage devices, in this example storage devices 122A, 122B, and 122C, and to one or more offline storage devices, in this example offline storage device 124. Network 112 may, for example, be a Storage Area Network (SAN), a LAN with Network-Attached Storage (NAS), or any network capable of coupling storage devices to a host system 100. The storage devices and offline storage devices may include any of one or more types of storage devices including, but not limited to, storage systems such as RAID (Redundant Array of Independent Disks) systems, disk arrays, JBODs (Just a Bunch Of Disks, used to refer to disk cabinets that do not have a built-in RAID controller), tape devices, and optical storage devices.

Host system 100 may include, in memory 104, file system software 106 and an HSM application 108. File system software 106 may include functionality for establishing and maintaining a file system 120 on one or more storage devices coupled to host system 100 via network 112. In this example, a file system 120 is established and maintained on storage devices 122A, 122B, and 122C. File system functionality may be provided by any of various File System software implementations including, but not limited to, Veritas' VxFS software or NFS software. Note that, while FIG. 1 illustrates file system software 106 and HSM application 108 residing on the same host system 100, HSM application 108 may reside on a different system than file system software 106 in the network storage environment.

Embodiments may provide a mechanism or mechanisms in file system software 106 to allow an HSM application 108 to detect subfile level inactivity and to migrate inactive parts of files from file system 120 to offline storage, e.g. offline storage device 124. In embodiments, the file system software 106 may record and maintain timestamps 110 at the extent, block or range level of files so that the HSM application 108 can determine inactivity of each file extent, block or range and migrate individual extents, blocks, or ranges that are determined to be inactive to offline storage. Offline storage device 124 may typically be magnetic tape or optical storage, but may be any other type of storage suitable for storing inactive parts of files offline, including disk drives. In one embodiment, partial file migration may be performed to migrate inactive parts of files from high-cost, typically high-performance, online storage devices (e.g. disk drives such as SCSI disks) to any type of lower-cost, typically lower-performance, offline storage devices, including, but not limited to, tape devices, optical storage devices, and disk drives (e.g. ATA disks).

In one embodiment, access information including subfile-level timestamps may be recorded and maintained by a filter driver (not shown) that resides between the application(s) 132 and the file system software 106. In this embodiment, the filter driver may track read and write accesses to the files and file parts and maintain subfile-level timestamps for ranges of the files, or for blocks or extents if the filter driver can obtain the mapping information from the underlying file system software 106, even if the underlying file system software 106 does not do so.

In one embodiment, the subfile-level timestamp information 110 may be recorded and maintained in-memory only. For in-memory timestamps, in the event of a system crash or lack of file information in the in-memory pool, the HSM application 108 may rely on file level timestamps only until subfile-level timestamp information 110 is rebuilt in memory. In another embodiment, subfile-level timestamps 110 may be recorded and maintained in a separate file on disk to allow the subfile-level timestamp information to be persisted. In one embodiment, subfile-level timestamp information recorded and maintained in a file on disk may be cached to and accessed in memory and periodically flushed to the file on disk. In one embodiment, timestamps for extents of a file may be recorded and maintained in inodes within extent descriptors. If the extent descriptors fit in the inode (without requiring any indirect blocks), the timestamps may be updated "lazily" along with inode time updates. Memory-resident, file-resident, and inode-resident timestamps are further described below.

In one embodiment, a file change log may be used to enable detection of partial file inactivity and hence partial file migration. In this embodiment, the file change log of a file system may be used to record accesses to the file parts of a file, including subfile-level timestamp information for the accesses. The HSM application 108 may access the file change log to examine the subfile-level timestamp information and determine which parts of the file are inactive and thus may be migrated offline. Using the file change log to record file accesses and detect partial file inactivity is further described below.

In one embodiment, the subfile-level timestamps may be recorded and maintained as extended attributes of the file(s) for which subfile-level timestamps are being recorded and maintained. In one embodiment, the subfile-level timestamps may be recorded and maintained in named streams on the file(s) for which subfile-level timestamps are being recorded. As used herein, a named stream may be defined as another stream of data associated with the same file but referenced through another name. For example, several inodes may be associated with a file, each holding different data and each referenced through a different name. In one embodiment, policies may be implemented and used in determining files and/or file parts that are to be included in or excluded from the access information (e.g., only files larger than a specific size may be monitored, only file parts larger than a specific size may be monitored, etc.).

While FIG. 1 illustrates partial file migration in an exemplary network storage environment, note that embodiments may be implemented in other types of computing environments, even in a single computer system with dedicated storage. In general, embodiments may be implemented in any computer environment that implements a file system and supports the migration of files to offline storage. Also note that, while embodiments are described as using an HSM application to examine timestamp information to determine inactive parts of files and migrate the files offline, other software, hardware, or a combination of software and hardware may be used in partial file migration as described herein.

Embodiments may be implemented for file systems in a cluster environment, which may be referred to as cluster file systems. Clustering is the use of multiple computers, storage devices, and redundant interconnections to form what appears to users as a single highly available system. Cluster computing can be used for load balancing as well as for high availability. In one embodiment, access information may be recorded and maintained separately for each node in a cluster, for example in memory. Each time the HSM application 208 wants to poll the file set being monitored, it requests a merge of the access information across all the nodes in the cluster. In one embodiment, loss of access information due to a node crash may be reduced by having nodes exchange the access information for files during lock grants and revokes.

In one embodiment, in a data warehousing environment and database setups in general, the database files may be created such that the active and inactive parts of the files are in separate file parts (e.g., extents). In one embodiment, a utility or utilities used to create files for tablespaces (for example, qiomkfile for Veritas' VxFS) may be used to create and then extend the file to have allocation for the extension happen from a separate extent. For example, if ten files are to be created, each having an active portion of 16 k and the rest of which can potentially remain inactive, then ten files of 16 k may be created, and then each of the files may be extended to the required size.

Figure 2A:
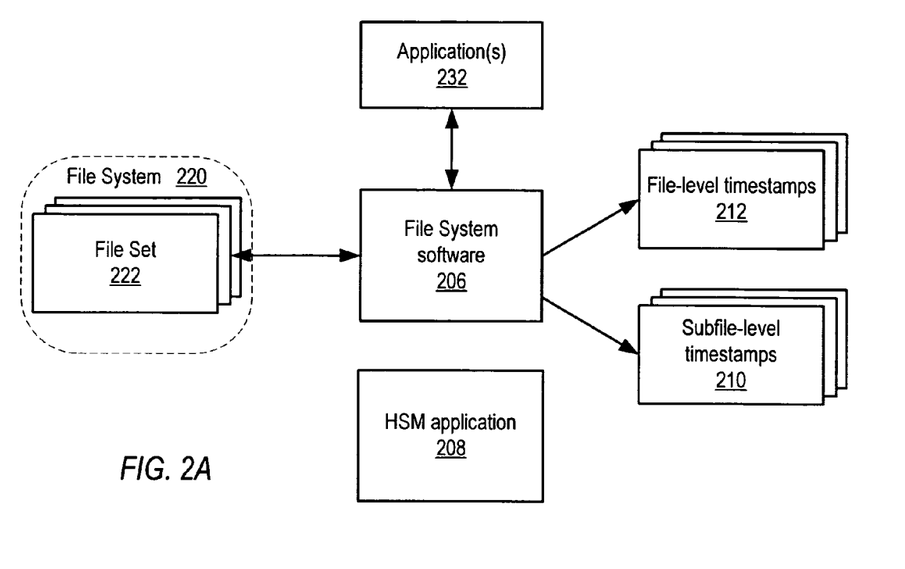
FIGS. 2A and 2B illustrate recording maintaining subfile-level timestamp information for a file set and using the timestamp information to detect subfile-level inactivity for partial file migration according to one embodiment.
Figure 2B:
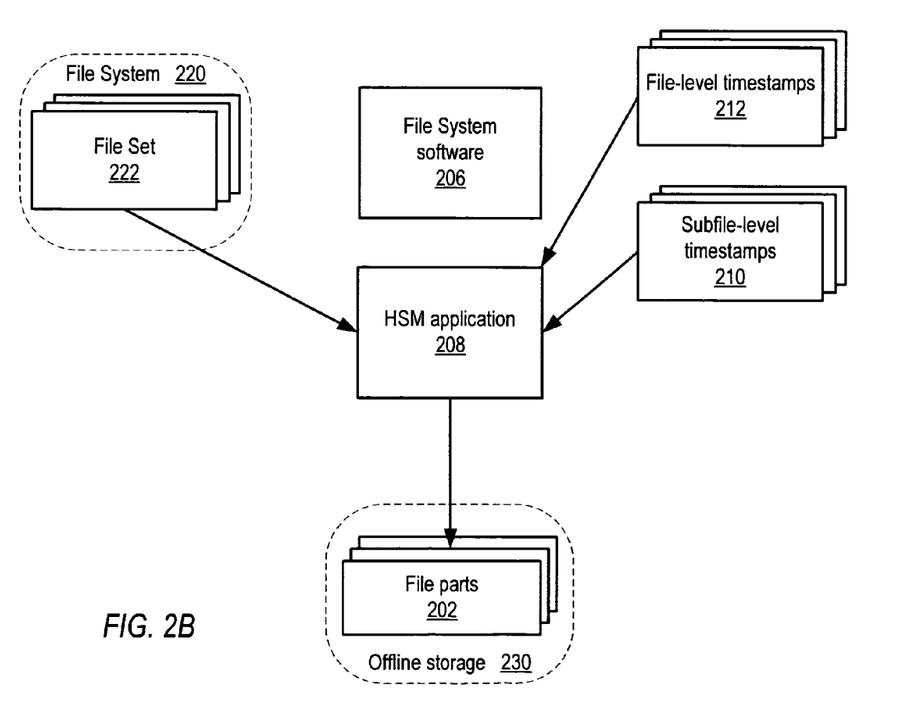

FIGS. 2A and 2B illustrate recording maintaining subfile-level timestamp information for a file set and using the timestamp information to detect subfile-level inactivity for partial file migration according to one embodiment. In FIG. 2A, an HSM application 208 monitors a set of files 222 in a file system 220. File set 222 may include one or more, or even all, of the files in file system 220. When a file is added to the file set 222, a file-level timestamp 212 for the file is initialized (e.g. to the system time), which is different and distinct from the normal inode timestamp typically uses to determine file age. All of the file parts (e.g. extents, blocks, or ranges) in the file may be considered accessed at least at the time indicated by the file-level timestamp 212. As and when, during normal file system operations, a file part in the file is accessed by an application 232 via file system software 206, an entry is made or updated in subfile-level timestamps 210 for the file part that indicates the time that the file part was accessed. Note that, in one embodiment, accesses to file parts in a file do not trigger an update to the file-level timestamp 212 for the file. In one embodiment, subfile-level timestamps 210 may be recorded and maintained in-memory. In another embodiment, subfile-level timestamps 210 may be recorded and maintained in a file on disk.

In one embodiment, the entry is made or updated by file system software 206. For example, if there is a read or some other operation on some file part of a file in file set 222, during the operation, if there is no entry in subfile-level timestamps 210 for the file part, the file system software 206 makes an entry in subfile-level timestamps 210 for the file part affected by the operation. If there is already an entry in subfile-level timestamps 210 for the file part, the file system software 206 updates the timestamp for the file part affected by the operation.

In another embodiment, access information including subfile-level timestamps may be recorded and maintained by a filter driver (not shown) that resides between the application(s) and the file system software 206. In this embodiment, the filter driver may track read and write accesses to the files and file parts and maintain subfile-level timestamps for ranges of the files, or for blocks or extents if the filter driver can obtain the mapping information from the underlying file system software 206, even if the underlying file system software 206 does not do so.

If there is no subfile-level timestamp 210 for a file part of a file in the file set 222, it indicates that the file part was not accessed any later than the file-level timestamp 212 associated with the file that was initialized when the file was added to the file set 222.

FIG. 2B illustrates partial file migration according to one embodiment. At some point, the HSM application 208 may perform a partial file migration. For example, the HSM application 208 may be scheduled to execute a partial file migration at some time interval (e.g. once a day, once a week, etc.), a partial file migration may be automatically triggered by an event (e.g. a threshold of disk space usage in the file system being reached), or a partial file migration may be initiated by a user or administrator. In FIG. 2B, during the partial file migration process, the HSM application 208 may examine the file set 222 to determine which file parts are aged, if any. In one embodiment, the HSM application 208 may obtain extent, block, or range-level maps (which may be referred to as "file part map") of the files in file set 222 from file system software 206 for use in determining what file parts are in each file in file set 222. The HSM application 208 may determine the current system time and examine the subfile-level timestamps 210 for each file in file set 222, if any, and compare the times indicated by the subfile-level timestamps 210 to the system time to determine if there are any file parts that have been inactive for a given time interval (e.g. a month, three months, etc.). These file parts would either not have subfile-level timestamps 210 or would have subfile-level timestamps 210 that have aged past the given time interval. These file parts may be referred to as "aged file parts".

In one embodiment, the HSM application 208 may compare the file-level timestamps 212 for the files to the current system time. If the file-level timestamp 212 for a file in the file set 222 indicates that the file was added to the file set prior to the given time interval used to determine if file parts are aged, the HSM application 208 may examine the subfile-level timestamps 210 for the file, if any. If the file-level timestamp 212 for a file in the file set 222 indicates that the file was added to the file set 222 more recently than the given time interval used to determine if file parts are aged, the HSM application 208 may not examine the subfile-level timestamps 210 for the file, since any subfile-level timestamps 210 for the file would be more recent than the file-level timestamp 212 for the file.

When examining the subfile-level timestamps 210 for a file, if there is no subfile-level timestamp 210 for a file part, then the HSM application 208 knows that the file part was not accessed since the file was added to the file set 222, and is thus aged. If there is a subfile-level timestamp 210 for a file part, but the difference between the time indicated by the subfile-level timestamp 210 and the current system time is greater than the given time interval, then the HSM application 208 determines that the file part is aged. If there are one or more aged file parts in a file, the aged file parts may be migrated to offline storage 230 by the HSM application 208, leaving any file parts determined to be active (not aged) on the file system 220.

Note that, if the file-level timestamp 212 for a file in the file set 222 indicates that the file was added to the file set prior to the given time interval used to determine if file parts are aged, and there are no sub-file timestamps 210 for the file, the HSM application may determine that the entire file has aged and thus migrate the entire file to offline storage.

Figure 3A:
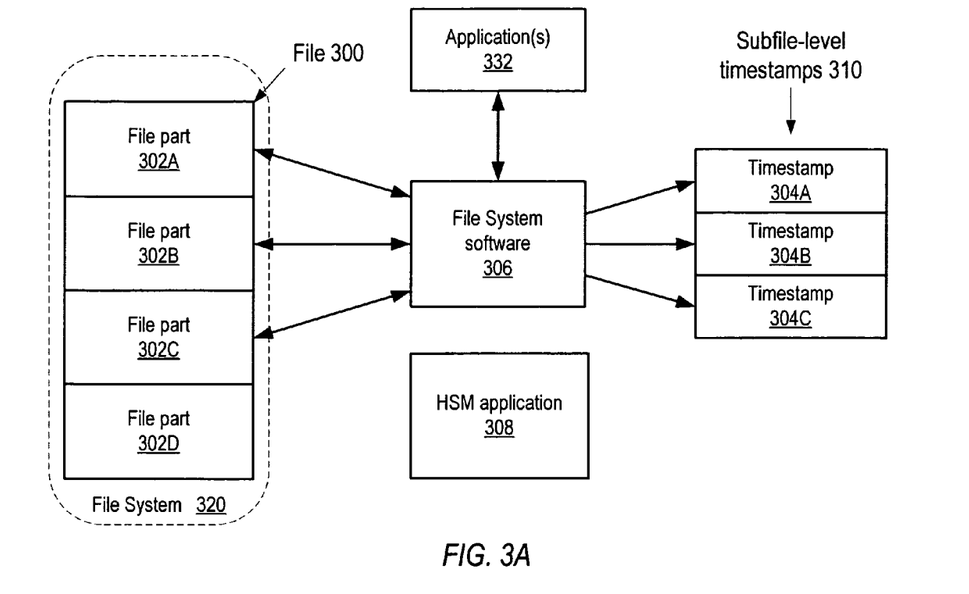
FIGS. 3A through 3D illustrate recording and maintaining subfile-level timestamp information for a file and using the timestamp information to detect subfile-level inactivity for partial file migration according to one embodiment.

FIGS. 3A through 3D illustrate recording and maintaining subfile-level timestamp information for a file and using the timestamp information to detect subfile-level inactivity for partial file migration according to one embodiment. In FIG. 3A, during normal file system operations, if a file part 302 in a file 300 on file system 320 is accessed by an application 332 via file system software 306, a timestamp 304 entry is made or updated in subfile-level timestamps 310 (which may, for example, be a file kept in-memory or on disk) for the file part 302 that indicates the time that the file part 302 was accessed.

In one embodiment, the entry is made or updated by file system software 306. For example, if there is a read or some other operation on some file part 302 of file 302, during the operation, if there is no entry in subfile-level timestamps 310 for the file part 302, the file system software 306 makes an entry in subfile-level timestamps 310 for the file part 302 affected by the operation. If there is already an entry in subfile-level timestamps 310 for the file part 302, the file system software 306 updates the timestamp 304 for the file part 302 affected by the operation.

In another embodiment, access information including subfile-level timestamps may be recorded and maintained by a filter driver (not shown) that resides between the application(s) and the file system software 306. In this embodiment, the filter driver may track read and write accesses to the files and file parts and maintain subfile-level timestamps for ranges of the files, or for blocks or extents if the filter driver can obtain the mapping information from the underlying file system software 306, even if the underlying file system software 306 does not do so.

Figure 3B:
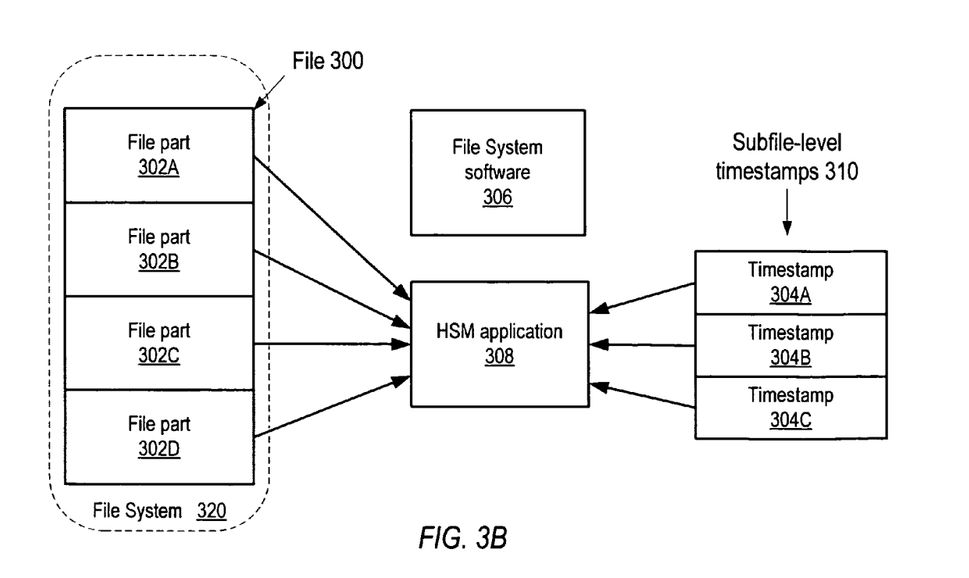

FIG. 3B illustrates partial file migration for a file according to one embodiment. At some point, the HSM application 308 may perform a partial file migration. For example, the HSM application 308 may be scheduled to execute a partial file migration at some time interval, a partial file migration may be automatically triggered by an event, or a partial file migration may be initiated by a user or administrator. In FIG. 3B, during the partial file migration process, the HSM application 308 may examine subfile-level timestamps 310 for file 300 to determine which file parts 302 have aged, if any. In one embodiment, to determine the file parts 302 (e.g. extents blocks, or ranges) of a file, the HSM application 308 may access the file system software 306 to obtain file part (extent, block or range) information for a file 300. File system software typically supports one or more APIs from which extent, block, or range maps of files can be determined. From the map, the HSM application 308 can determine the file parts 302 of the file 300. The HSM application 308 may then use the map to search for entries in subfile-level timestamps 310 for the corresponding file parts 302.

The HSM application 308 may determine the current system time and examine the timestamp 304 for each file part 302, if any, and compare the times indicated by the timestamp 304 to the system time to determine if the file part 302 has been inactive for some given time interval. If there is no timestamp 304 for a file part 302 in subfile-level timestamps 310, it indicates that the file part 302 was not accessed any later than the file-level timestamp (different and distinct from the inode timestamp typically used to determine file age) associated with the file 300 (not shown). In this example, the assumption is made that the file-level timestamp indicates that the file 300 was created or added to the file set being monitored by the HSM application 308 prior to the given time interval. In this example, there is no timestamp 304 for file part 304D, and thus HSM application 308 determines that file part 302D has aged (has not been accessed for at least the given time interval).

If there is a timestamp 304 for a file part 302, the HSM application 308 may compare the timestamp 304 to the current system time. If the difference between the time indicated by the timestamp 304 and the current system time is greater than the given time interval, then the HSM application 208 determines that the file part 302 associated with the timestamp is aged. In this example, HSM application 308 examines timestamp 304A for file part 302A, timestamp 304B for file part 302B, and timestamp 304C for file part 302C. This examination may determine, in this example, that file parts 302A and 302B have not aged, but file part 302C has aged.

Figure 3C:
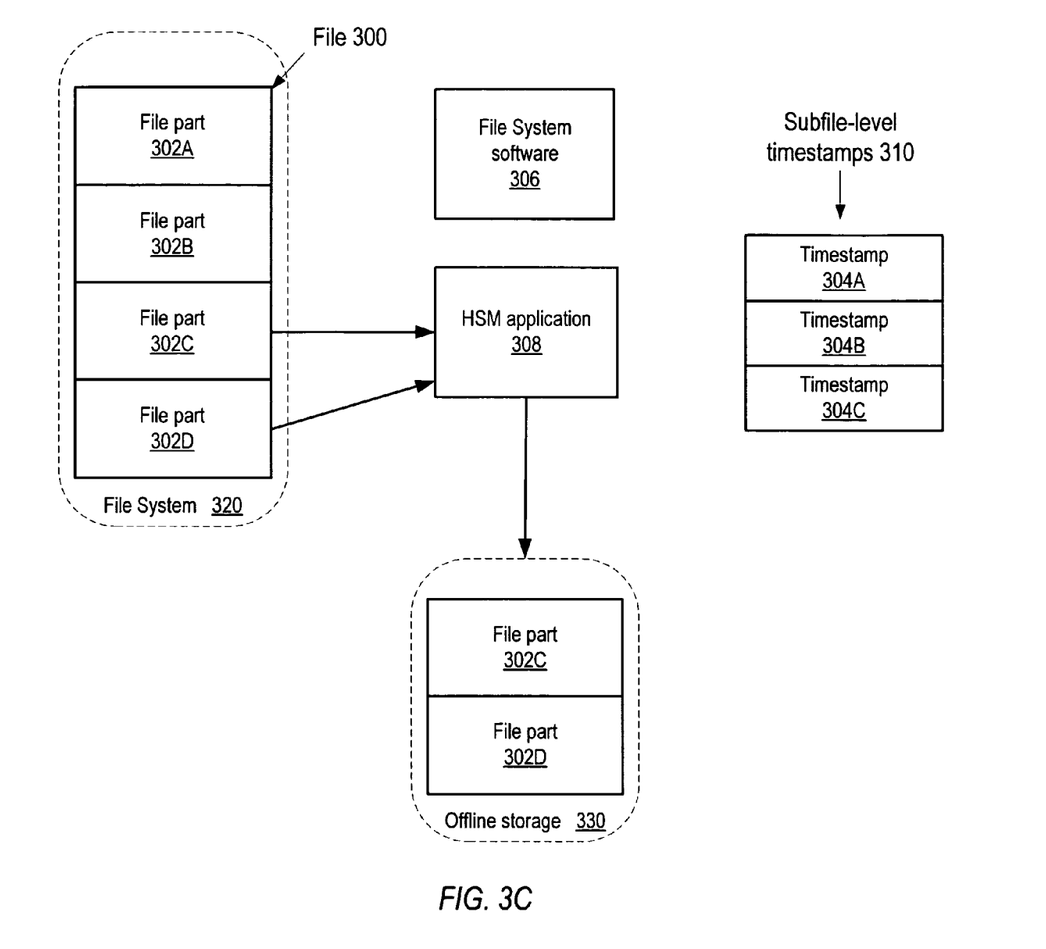

In FIG. 3C, if there are one or more aged file parts 302 in file 300, the aged file parts 302 may be migrated to offline storage 330 by the HSM application 208, leaving any file parts determined to be active (not aged) on the file system 320. In this example, file parts 302C and 302D are determined to be aged by HSM application 308, and are thus migrated to offline storage 330. Offline storage 300 devices may typically be magnetic tape or optical storage, but may be any other type of storage suitable for storing aged file parts 302 offline, including disk drives. In one embodiment, partial file migration may be performed to migrate aged file parts 302 from high-cost, typically high-performance, online storage devices (e.g. disk drives) to any type of lower-cost, typically lower-performance, offline storage devices, including, but not limited to, tape devices, optical storage devices, and disk drives.

Figure 3D:
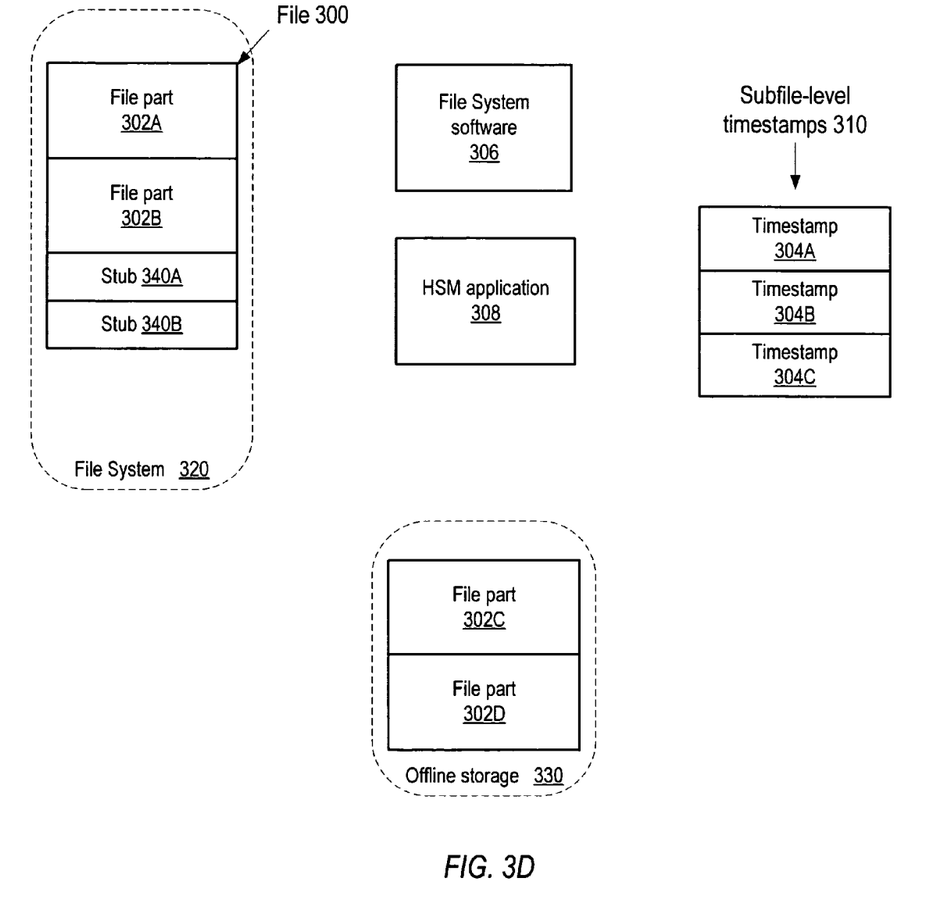

In FIG. 3D, any file parts 302 of file 300 that have been migrated to offline storage 330 by HSM application 308 may be indicated in file system 320 by a stub 340 or other indicator, such as a DMAPI managed region described below. In this example, file part 302C has been replaced by stub 340A, and file part 302D by stub 340B. If file system software 306 needs to access a file part 302 that has been migrated offline (for example, to fulfill a read or write request of an application), then the stub 340 indicates to the file system software 306 needs to request the HSM application 308 to migrate the file part back online before the access can be completed. For example, if file system software 306 needs to access file part 302C, then stub 340A indicates to the file system that the file part 302C has been migrated offline. File system software may request HSM application 308 to migrate the file part 302C back online. HSM application 308 may then handle restoring the file part 302C from offline storage 330 back into file system 320. Once the restore is completed, HSM application 308 may notify file system software 306 that file part 302C has been restored. File system software 306 may then perform the operation on the file part 302C.

One embodiment may use the Data Management API (DMAPI) specification, which many file systems support, in migrating files and parts of files. DMAPI is used in conjunction with a file system and an HSM application to support the migrating in and out of data in a file system. Migration happens transparently without any user intervention. Using DMAPI, if a part of a file is migrated offline, the HSM application 308 generates managed region information for the file that indicates that the part of the file is offline. In one embodiment, there may be a set of managed regions for each file in a file set. The HSM application 308 may set as many managed regions for a file as necessary. For each part of a file that is migrated offline, the HSM application 308 creates a managed region. When the file system software 306, in performing some operation that requires the part of the file to be online in the file system (e.g. a read or write), examines the managed region information to determine that the part of the file is not present in the file system on disk, the file system software 306 notifies the HSM application 308 to migrate that part of the file back onto the disk and into the file system before it completes the operation. After the HSM application migrates the file part back online, the file system can complete the operation.

Figure 4:
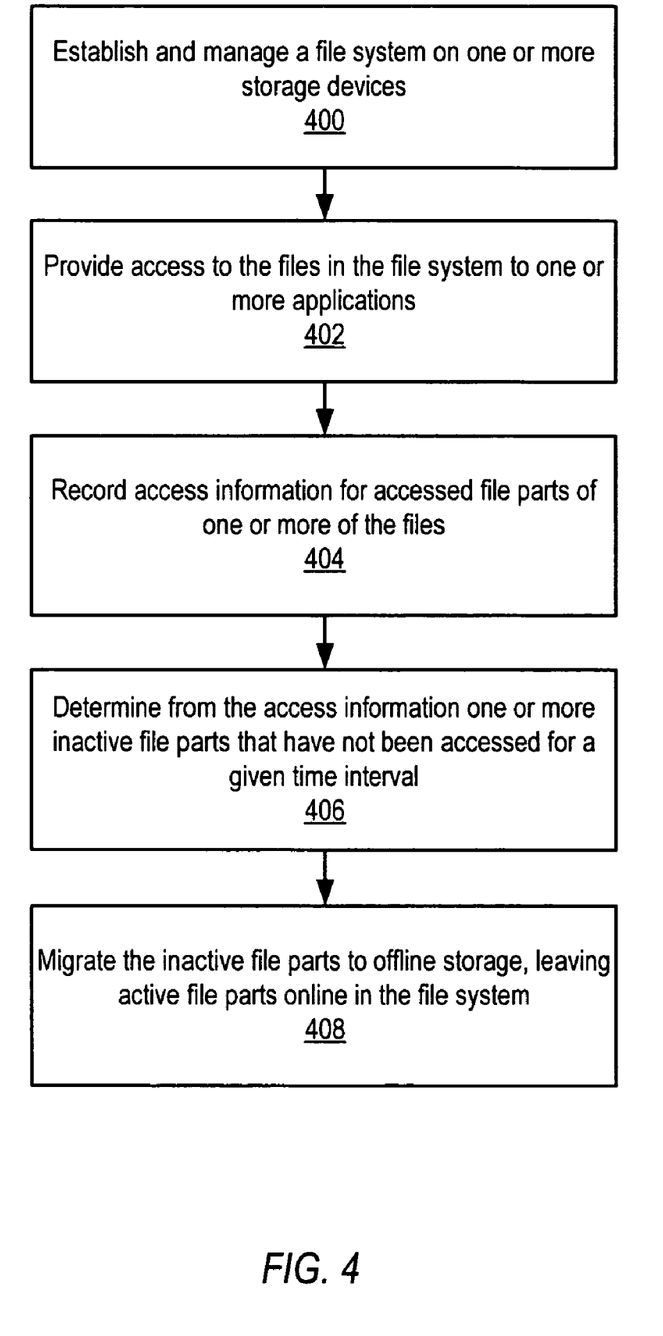
FIG. 4 is a flowchart of a method for partial file migration in file systems by HSM applications according to one embodiment.

FIG. 4 is a flowchart of a method for partial file migration in file systems by HSM applications according to one embodiment. As indicated at 400, file system software may establish and manage a file system on one or more storage devices. As indicated at 402, the file system software may provide access to files in the file system to one or more applications. Each file may include one or more file parts that may be individually accessed by the application(s). The file parts may be one of extents, blocks, or ranges, as described below. As indicated at 404, the file system software may record access information for file parts of a set of one or more of the files if and when the file parts are accessed by the application(s). The access information for each accessed file part may include a timestamp indicating the access time for that file part. In one embodiment, the access information is recorded in-memory only. In one embodiment, the access information is recorded in a separate file in the file system. In one embodiment, for each of the one or more files in the file set, the access information is recorded in a file change log for the file system. In one embodiment, the file parts are extents, and the access information is recorded in extent descriptors for the one or more files.

Note that, in one embodiment, access information including subfile-level timestamps may be recorded and maintained by a filter driver that resides between the application(s) and the file system software. In this embodiment, the filter driver may track read and write accesses to the files and file parts and maintain subfile-level timestamps for ranges of the files, or for blocks or extents if the filter driver can obtain the mapping information from the underlying file system software, even if the underlying file system software does not do so.

At some point, an HSM application may perform a partial file migration. In performing the partial file migration, the HSM application may determine from the access information one or more inactive file parts that have not been accessed for a given time interval, as indicated at 406. To determine the inactive file parts, the HSM application may compare a map of the file parts of each of the one or more files set to the access information. In one embodiment, the map may be obtained from the file system software. If a file part indicated by the map does not have recorded access information, the HSM application determines that the file part is an inactive file part, and can thus be migrated offline. If a file part indicated by the map does have recorded access information, the HSM application determines if the accessed file part is an active or inactive file part from the access information for the accessed file part.

To determine if the accessed file parts are active or inactive file parts, the HSM application determines the difference between the last access time for each accessed file part and a current system time. If the difference between the last access time for an accessed file part and the current system time is less than the given time interval, the HSM application determines that the accessed file part is an active file part. If the difference between the last access time for an accessed file part and the current system time is greater than the given time interval, the HSM application determines that the accessed file part is an inactive file part. As indicated at 408, the HSM application may then migrate the inactive file parts to offline storage leaving the active file parts online in the file system.

Extent-level Timestamps

One embodiment may support timestamps at the extent level of files in a file system so that the HSM application can determine inactivity of each file extent and migrate individual extents if required. One embodiment may support recording and maintaining the extent-level timestamps in extent descriptors within inodes on disk. Note that it may be expensive to maintain the timestamps in extent descriptors on disk for each extent of each file. Therefore, one embodiment may record and maintain extent-level timestamps in memory only. Another embodiment may record and maintain extent-level timestamps in a separate file such as a 'quotas' file. Although maintaining the timestamps in a separate file is not as fast as maintaining the timestamps in-memory, this embodiment may still perform better than storing timestamps with each extent descriptor on disk within the inode since the timestamps need not be part of the inode metadata, and hence can be updated asynchronously to disk, unlike inode metadata which are typically updated transactionally and hence might require involuntary updates to disk, for example when the log space is low. Staleness of the timestamp information may at most cause unnecessary migrations of data to and from tape. In one embodiment, the timestamps may be recorded and maintained within the extent descriptors provided the inode has very few extents all of whose descriptors fit in the inode, which is typically the case for database setup and QIO files in file systems such as VxFS. In such a case, the timestamps may be updated lazily whenever an inode is asynchronously flushed to disk.

Block-level Timestamps

One embodiment may support timestamps at the block level of files in a file system so that the HSM application can determine inactivity of each file block and migrate individual blocks if required. The operation of embodiments that support block level timestamps may be similar to that described for extent timestamps, except that the timestamps are associated with blocks in the file rather than extents. This embodiment may require more information to be recorded and maintained than embodiments using extent level timestamps, especially for larger files that have many blocks. Database files are typically allocated in groups or extents of contiguous blocks if possible, and thus contain few extents when compared with the number of blocks.

Range-level Timestamps

In typical storage systems, data is transported from disk to memory in blocks, but an application can read from or write to an arbitrary number of bytes. The system calls supported by the operating system or file system typically allow an application to specify an offset and a number of bytes (i.e., a range) that it wants to read or write.

One embodiment may support timestamps at the range level of files in a file system so that the HSM application can determine inactivity of each file range and migrate individual ranges if required. The operation of embodiments that support range level timestamps may be similar to that described for extent timestamps, except that the timestamps are associated with specific offsets and lengths (i.e., ranges) in the file rather than extents. One benefit of this embodiment is that it allows database files to be pre-allocated in a single extent, which is not desirable in the extent level approach, and for timestamps to be recorded and maintained for ranges within the extent.

A range is defined by an offset into a file and a length (e.g. in bytes) of the range. A range may or may not be associated with any particular extent or block in the file. Ranges may be fixed size or sized based on how an application accesses the files. As and when an application reads or writes to a file, for the portion of the file that the application is reading or writing to, the corresponding offset and length for that portion may be used as the range, and the timestamp for that range may be recorded, for example in memory or in a file.

Memory-resident Timestamps

One embodiment may support recording and maintaining access information including timestamp information for file parts (extents, blocks, or ranges) in memory. For memory-resident timestamps, depending on the available memory, timestamp information may be recorded and maintained for a predetermined set of files. For each file, as and when file parts are accessed, the time of the access is recorded or updated in a timestamp in memory. If the HSM application determines a file to be active, it can examine the in-memory timestamp information to find out if there are file parts in the file that are inactive and thus can be migrated to offline storage. In one embodiment, in the event of a system crash or lack of file information in this in-memory pool of timestamp information, the HSM application may rely on file-level timestamps until file part-level timestamp information is rebuilt in memory.

In one embodiment, the set of files to be monitored by the HSM application may be initialized for each file system during its mount. In one embodiment, access information for the file set is recorded and maintained in-memory. Each file's access information may include a file-level timestamp (different and distinct from the inode timestamp) that may be initialized to the time when that file is added to the file set being monitored. All file parts in the file are considered accessed at least at this time. During normal file system operation, as and when a file part is accessed, a timestamp is recorded or updated for the file part in the access information for this file. The absence of an entry for a file part in the access information for a file indicates that the file part was not accessed any later than the time corresponding to the file level timestamp in the access information. The access information may be updated as and when file parts are added or removed from a file.

At some point, the HSM application may perform a partial file migration. For example, the HSM application may be scheduled to execute a partial file migration at some time interval (e.g. once a day, once a week, etc.), a partial file migration may be automatically triggered by an event (e.g. a threshold of disk space usage in the file system being reached), or a partial file migration may be initiated by a user or administrator. In performing the partial file migration, the HSM application may, for each file in the file set being monitored, examine the access information to determine which file parts have aged out and have thus become eligible for migration to offline storage. If there is no timestamp for a file part in the access information for a file, it indicates that the file part was not accessed any later than the file-level timestamp (different and distinct from the inode timestamp) associated with the file. If there is a timestamp for a file part, the HSM application may compare the timestamp to the current system time. If the difference between the time indicated by the timestamp and the current system time is greater than a given time interval for aging files, then the HSM application determines that the file part associated with the timestamp is aged. If there are one or more aged filed parts in a file, the aged file parts may be migrated to offline storage by the HSM application, leaving any file parts that are active (not aged) on the file system. Any file parts of a file that are migrated to offline storage by the HSM application may be indicated in the file by a stub or other indicator, such as a DMAPI managed region.

Note that, if the file-level timestamp (different and distinct from the inode timestamp) for a file in the file set indicates that the file was added to the file set prior to the given time interval used to determine if file parts are aged, and there are no sub-file timestamps for the file, the HSM application may determine that the entire file has aged and thus migrate the entire file to offline storage.

In one embodiment, DMAPI support in the file system and multiple managed regions may be used to allow user-transparent migration of parts of files in and out of the file system as and when required. In this embodiment, for example, if the HSM application has migrated out a file part of a file, it would set a managed region for that file part so that any subsequent read/write operation in that region will cause the file system to generate a DMAPI event to instruct the HSM application to migrate in that file part of the file before the file system operation can proceed.

A benefit of keeping the access information in memory only is that it may provide less impact on normal file system operations than other methods. However, in the event of a system crash, the system loses all the timing information about file parts, so that effectively migration is postponed until access information can be rebuilt.

File-resident Timestamps

In one embodiment, access information including subfile-level timestamps may be recorded and maintained in a separate file in the file system and used for detecting subfile-level inactivity for partial file migration. Thus, the access information may be persisted across reboots. The data in the access information file may be formatted as a collection of records with one record for each file in the file set being monitored, or alteratively as an index structure that allows more efficient search for the access information for a specific file (e.g. inode number).

In one embodiment, instead of having a single access information file, there may be a separate access information file for each file in the file system for which subfile-level timestamps are being recorded and maintained, and the access information for each of these file may be recorded and maintained in its associated access information file.

Other embodiments may use other numbers or combinations of access information files; for example, files in a file system may be grouped into two or more sets of files, and an access information file for each of the file sets may be used to record and maintain access information for its associated file set.

In one embodiment, the subfile-level timestamps may be recorded and maintained as extended attributes of the file(s) for which subfile-level timestamps are being recorded and maintained. In one embodiment, the subfile-level timestamps may be recorded and maintained in named streams in the file(s) for which subfile-level timestamps are being recorded. For example, for a file name 'foo', the subfile-level timestamps may be stored in a named stream 'foo:tstamp' on the file 'foo'.

The operations described for embodiments that use file resident timestamps may be similar to those described for embodiments that use memory-resident timestamps, except that the access information is recorded and maintained in a separate file in the file system, which may be cached into memory, rather than in-memory only.

In one embodiment, access information for the file may be cached in memory, and the cached access information may be flushed to the file on disk asynchronously. For example, the cached access information may have to be flushed to disk when running short of memory. In the event of a system crash, one or more subfile-level timestamp updates in the cached access information may be lost. If this happens, one or more file parts may later be migrated offline earlier than otherwise, and may be migrated back into the file system if accessed. However, this potential loss of timestamp information does not cause any problems with the file data. Note that the access information file does not have to be updated transactionally, hence is not subjected to involuntary updates to disk, for example due to low log space.

Inode-resident Timestamps

In one embodiment, subfile-level timestamp information may be recorded and maintained within extent descriptors on the file system and used for detecting subfile-level inactivity for partial file migration. In some file systems, extent descriptor information may be kept in inodes for each extent. This extent information may include the block number, the number of blocks, offset information, file information, etc. Along with this information, the extent timestamp may be recorded and maintained. File systems typically cache inodes from disk in memory, thus timestamps may be kept in the in-memory inode table and in the inodes on disk along with the extent information.

The operations described for embodiments that use inode-resident timestamps may be similar to those described for embodiments that use memory-resident timestamps, except that the access information is recorded and maintained in inodes in the file system, rather than in-memory only.

A timestamp may be updated whenever the extent descriptor is accessed. Inode resident timestamps may be most efficient when there are few extents so that all of the extent descriptors fit in the inode without requiring indirect blocks, thus allowing updates of the timestamps in in-memory inodes whenever inode times are updated and flushing of the timestamps to disk whenever the inode is asynchronously flushed to disk.

Some file systems have an inode organization that attempts to keep the extent descriptors within the inode itself, but if the number of extent descriptors grows too large, then an indirect block will be allocated to store the extent descriptors. If a single level of indirect blocks is not sufficient, the file system may use multi-level indirect blocks. In some cases, some kind of index structure such as a B-tree may be used to hold the extent information. The indirect blocks and index structure may be considered metadata, and any updates to the metadata, if the file system is a journaling file system or a transactional file system, has to be done transactionally. For every read and write, the inode metadata may need to be updated. Transactions may be expensive because log space and updates to log have to be flushed to disk, etc.

If it is known that files in a file system have few extents, so that the extent descriptors fit in the inodes themselves and thus indirect blocks are not needed to hold the extent information, timestamps may be recorded and maintained in the extent descriptors and updated asynchronously to disk. In this case, there is no overhead of transactionally updating the timestamp information, because the information will go to disk only when the inode information is asynchronously flushed to disk. The inode information on disk is updated with the cached inode information asynchronously. The timestamp information in the inode is updated to disk whenever the inode gets flushed back to disk from cache. Therefore, no explicit flush of the timestamp information to disk is necessary, even though the timestamp information may be kept with each extent descriptor, because the extent descriptor is part of the inode itself and the file system flushes the cached inode information to disk in the background.

File Change Log

File systems may use a file change log, typically a circular log file, where the file system software records changes to files. In one embodiment, the file change log may be used to record reads and writes to file parts of the file, including extent, block or range information identifying the file part that was accessed and timestamp information indicating when the file part was accessed. The HSM application may examine the file change log for a given time interval (typically the inactive time limit) to detect subfile-level inactivity for partial file migration. The file system software may provide an interface that the HSM application can use to access the file change log. The HSM application may examine the file change log to determine to determine which parts of the file have been accessed. If a file part has been accessed, the HSM application sees an entry in the file change log and determines that the file part has been accessed at the time indicated by the timestamp. Depending on how far in the past the access was, the HSM application can determine whether the part of the file is to be migrated offline. No entry in the file change log for a file part indicates to the HSM application that the file part has not been accessed and thus may be migrated offline.

The operations described for embodiments that use a file change log to record and maintain timestamps may be similar to those described for embodiments that use memory-resident timestamps, except that the access information is recorded and maintained in file change logs in the file system, rather than in-memory only.

Depending on the particular file system's implementation of the file change log, recording of reads and writes may impose an overhead on the normal file system operations. For example, if updates to the file change log are done transactionally, then the overhead may be significant. However, if the log is used only for HSM, then the file change log may be updated asynchronously to disk without requiring transactional updates. In one embodiment, if the file change log wraps around faster than the inactive time limit of HSM, the HSM application may make a copy of the file change log before it wraps around. The HSM application may then concatenate two or more copies of the file change log to determine inactive parts of a file in the period tracked by the concatenated set of log copies.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a processor; and
    a memory comprising program instructions, wherein the program instructions are executable by the processor to implement:
        file system software configured to:
            establish and manage a file system on one or more storage devices;
            provide access to files in the file system to one or more applications, wherein each file comprises one or more file parts;
            record access information, wherein the access information comprises file-level access information for each file as a whole and subfile-level access information for accessed file parts of one or more of the files;
        Hierarchical Storage Management (HSM) software configured to:
            dependent upon the file-level access information, examine the subfile-level access information to determine one or more inactive file parts that have not been accessed for a given time interval; and
            migrate the inactive file parts to offline storage;
        wherein active file parts remain online in the file system.

2. The system as recited in claim 1, wherein the access information is recorded in the memory.

3. The system as recited in claim 1, wherein the access information is recorded in a separate file in the file system.

4. The system as recited in claim 1, wherein, for each of the one or more files, the access information is recorded in a file change log for the file system.

5. The system as recited in claim 1, wherein the file parts are extents, and wherein the access information is recorded in inodes for the one or more files.

6. The system as recited in claim 1, wherein the file parts are one of extents, blocks, and ranges.

7. The system as recited in claim 1, wherein the access information for each accessed file part includes a timestamp indicating a last access time for that file part.

8. The system as recited in claim 1, wherein the access information for each accessed file part includes a timestamp indicating a last access time for that file part, and wherein, to determine from the access information one or more inactive file parts that have not been accessed for a given time interval, the HSM software is further configured to:
    determine the difference between the last access time for each accessed file part and a current system time;
    if the difference between the last access time for an accessed file part and the current system time is less than the given time interval, determine that the accessed file part is an active file part;
    if the difference between the last access time for an accessed file part and the current system time is greater than the given time interval, determine that the accessed file part is an inactive file part.

9. The system as recited in claim 1, wherein, to determine from the access information one or more inactive file parts that have not been accessed for a given time interval, the HSM software is further configured to:
    compare a map of the file parts of each of the one or more files to the access information;
    if a file part indicated by the map does not have recorded access information, determine that the file part is an inactive file part;
    if a file part indicated by the map does have recorded access information, determine from the access information for the accessed file part if the accessed file part is an active or inactive file part.

10. The system as recited in claim 1, wherein the file system is a cluster file system.

11. A system, comprising:
    a processor; and
    a memory comprising program instructions, wherein the program instructions are executable by the processor to implement:
        file system software configured to:
            establish and manage a file system on one or more storage devices;
            provide access to a plurality of files in the file system to one or more applications, wherein each file comprises one or more file parts;
            add one or more of the plurality of files for which access information is to be recorded to a file set;
            for each file added to the file set, record a file-level timestamp for the file indicating the time the file was added to the file set in access information for the file set; and
            record subfile-level timestamps for accessed file parts of the files in the file set in the access information for the file set;
        Hierarchical Storage Management (HSM) software configured to:
            determine from the access information one or more inactive file parts that have not been accessed for a given time interval; and
            migrate the inactive file parts to offline storage;
        wherein active file parts remain online in the file system.

12. The system as recited in claim 11, wherein, to determine from the access information one or more inactive file parts that have not been accessed for a given time interval, the HSM software is further configured to, for each of the files in the file set:
- compare the time indicated by the file-level timestamp for the file to a current system time;
- if the difference between the time indicated by the file-level timestamp for the file and the current system time is greater than the given time interval and there are no subfile-level timestamps associated with the file, migrate the file to offline storage;
- if the difference between the time indicated by the file-level timestamp for the file and the current system time is greater than the given time interval and there are subfile-level timestamps associated with the file, determine from the access information if one or more file parts of the file have not been accessed for the given time interval.

13. The system as recited in claim 12, wherein, to determine from the access information if one or more file parts of the file have not been accessed for the given time interval, the HSM software is further configured to:
- compare a map of file parts of the file to the access information;
- if a file part indicated by the map does not have recorded access information, determine that the file part is an inactive file part;
- if a file part indicated by the map does have recorded access information, determine from the access information for the accessed file part if the accessed file part is an active or inactive file part.

14. The system as recited in claim 12, wherein the subfile-level timestamps for accessed file parts of the files in the file set indicate a last access time for that file part, and wherein, to determine from the access information if one or more file parts of the file have not been accessed for the given time interval, the HSM software is further configured to:
- determine the difference between the last access time for each accessed file part of the file and a current system time;
- if the difference between the last access time for an accessed file part and the current system time is less than the given time interval, determine that the accessed file part is an active file part;
- if the difference between the last access time for an accessed file part and the current system time is greater than the given time interval, determine that the accessed file part is an inactive file part.

15. A system, comprising:
- one or more storage devices;
- a host system configured to couple to the storage devices via a network, wherein the host system comprises:
  - file system software configured to:
    - establish and manage a file system on the one or more storage devices;
    - provide access to files in the file system to one or more applications, wherein each file comprises one or more file parts;
    - record access information, wherein the access information comprises file-level access information for each file as a whole and subfile-level access information for accessed file parts of one or more of the files;
  - Hierarchical Storage Management (HSM) software configured to:
    - dependent upon the file-level access information, examine the subfile-level access information to determine one or more inactive file parts that have not been accessed for a given time interval; and
    - migrate the inactive file parts to offline storage on one of the one or more storage devices;
  - wherein active file parts remain online in the file system.

16. The system as recited in claim 15, wherein the access information is recorded in one of the memory, a separate file in the file system, and extent descriptors for the one or more files.

17. The system as recited in claim 15, wherein the file parts are one of extents, blocks, and ranges.

18. The system as recited in claim 15, wherein the access information for each accessed file part includes a timestamp indicating a last access time for that file part, and wherein, to determine from the access information one or more inactive file parts that have not been accessed for a given time interval, the HSM software is further configured to:
- determine the difference between the last access time for each accessed file part and a current system time;
- if the difference between the last access time for an accessed file part and the current system time is less than the given time interval, determine that the accessed file part is an active file part;
- if the difference between the last access time for an accessed file part and the current system time is greater than the given time interval, determine that the accessed file part is an inactive file part.

19. The system as recited in claim 15, wherein, to determine from the access information one or more inactive file parts that have not been accessed for a given time interval, the HSM software is further configured to:
- compare a map of the file parts of each of the one or more files to the access information;
- if a file part indicated by the map does not have recorded access information, determine that the file part is an inactive file part;
- if a file part indicated by the map does have recorded access information, determine from the access information for the accessed file part if the accessed file part is an active or inactive file part.

20. The system as recited in claim 15, wherein the file system is a cluster file system.

21. A system, comprising:
- means for recording access information, wherein the access information comprises file-level access information for each of one or more files as a whole and subfile-level access information for accessed file parts of the one or more files in a file system, wherein each file comprises one or more of the file parts;
- means for, dependent upon the file-level access information, examining the subfile-level access information to determine one or more inactive file parts that have not been accessed for a given time interval; and
- means for migrating the inactive file parts to offline storage, wherein active file parts remain online in the file system.

22. A method, comprising:
- recording access information, wherein the access information comprises file-level access information for each of one or more files as a whole and subfile-level access information for accessed file parts of one or more files in a file system, wherein each file comprises one or more of the file parts;
- dependent upon the file-level access information, Hierarchical Storage Management (HSM) software examining the subfile-level access information to determine one or more inactive file parts that have not been accessed for a given time interval; and the HSM software migrating the inactive file parts to offline storage, wherein active file parts remain online in the file system.

23. The method as recited in claim 22, wherein the access information is recorded by file system software.

24. The method as recited in claim 22, wherein the access information is recorded by a filter driver between applications that access the file system and file system software that manages the file system.

25. The method as recited in claim 22, wherein the access information is recorded in the memory.

26. The method as recited in claim 22, wherein the access information is recorded in a separate file in the file system.

27. The method as recited in claim 22, wherein, for each of the one or more files, the access information is recorded in a file change log for the file system.

28. The method as recited in claim 22, wherein the file parts are extents, and wherein the access information is recorded in extent descriptors for the one or more files.

29. The method as recited in claim 22, wherein the file parts are one of extents, blocks, and ranges.

30. The method as recited in claim 22, wherein the access information for each accessed file part includes a timestamp indicating a last access time for that file part.

31. The method as recited in claim 22, wherein the access information for each accessed file part includes a timestamp indicating a last access time for that file part, and wherein said determining from the access information one or more inactive file parts that have not been accessed for a given time interval comprises:
determining the difference between the last access time for each accessed file part and a current system time;
if the difference between the last access time for an accessed file part and the current system time is less than the given time interval, determining that the accessed file part is an inactive file part;
if the difference between the last access time for an accessed file part and the current system time is greater than the given time interval, determining that the accessed file part is an inactive file part.

32. The method as recited in claim 22, wherein said determining from the access information one or more inactive file parts that have not been accessed for a given time interval comprises:
compare a map of the file parts of each of the one or more files to the access information;
if a file part indicated by the map does not have recorded access information, determine that the file part is an inactive file part;
if a file part indicated by the map does have recorded access information, determine from the access information for the accessed file part if the accessed file part is an active or inactive file part.

33. The method as recited in claim 22, wherein the file system is a cluster file system.

34. A computer-accessible medium comprising program instructions, wherein the program instructions are configured to implement:
file system software recording access information, wherein the access information comprises file-level access information for each of one or more files as a whole and subfile-level access information for accessed file parts of the one or more files in a file system, wherein each file comprises one or more of the file parts;
Hierarchical Storage Management (HSM) software determining from the access information one or more inactive file parts that have not been accessed for a given time interval; and
the HSM software migrating the inactive file parts to offline storage, wherein active file parts remain online in the file system.

35. The computer-accessible medium as recited in claim 34, wherein the access information is recorded by file system software.

36. The computer-accessible medium as recited in claim 34, wherein the access information is recorded by a filter driver between applications that access the file system and file system software that manages the file system.

37. The computer-accessible medium as recited in claim 34, wherein the access information is recorded in one of the memory, a separate file in the file system, and extent descriptors for the one or more files.

38. The computer-accessible medium as recited in claim 34, wherein the file parts are one of extents, blocks, and ranges.

39. The computer-accessible medium as recited in claim 34, wherein the access information for each accessed file part includes a timestamp indicating a last access time for that file part, and wherein, in said determining from the access information one or more inactive file parts that have not been accessed for a given time interval, the program instructions are further configured to implement:
determining the difference between the last access time for each accessed file part and a current system time;
if the difference between the last access time for an accessed file part and the current system time is less than the given time interval, determining that the accessed file part is an active file part;
if the difference between the last access time for an accessed file part and the current system time is greater than the given time interval, determining that the accessed file part is an inactive file part.

40. The computer-accessible medium as recited in claim 34, wherein, in said determining from the access information one or more inactive file parts that have not been accessed for a given time interval, the program instructions are further configured to implement:
compare a map of the file parts of each of the one or more files to the access information;
if a file part indicated by the map does not have recorded access information, determine that the file part is an inactive file part;
if a file part indicated by the map does have recorded access information, determine from the access information for the accessed file part if the accessed file part is an active or inactive file part.

41. The computer-accessible medium as recited in claim 34, wherein the file system is a cluster file system.

* * * * *